United States Patent
Shioguchi (10) Patent No.: US 12,179,669 B2
(45) Date of Patent: Dec. 31, 2024

(54) IN-VEHICLE DISPLAY CONTROLLING DEVICE AND DISPLAY CONTROLLING METHOD FOR IMPROVED DISPLAY OUTPUT OF OPERATIONS

(71) Applicant: Faurecia Clarion Electronics Co., Ltd., Saitama (JP)

(72) Inventor: Takuma Shioguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 74 days.

(21) Appl. No.: 17/982,905

(22) Filed: Nov. 8, 2022

(65) Prior Publication Data

US 2023/0143429 A1 May 11, 2023

(30) Foreign Application Priority Data

Nov. 11, 2021 (JP) ................. 2021-184308

(51) Int. Cl.
*B60R 1/28* (2022.01)
*H04N 23/62* (2023.01)

(52) U.S. Cl.
CPC ............. *B60R 1/28* (2022.01); *H04N 23/62* (2023.01); *B60R 2300/303* (2013.01); *B60R 2300/306* (2013.01); *B60R 2300/602* (2013.01)

(58) Field of Classification Search
CPC ............. B60R 1/28; B60R 2300/303; B60R 2300/306; B60R 2300/602; H04N 23/62; H04N 7/181; H04N 23/69; H04N 23/815; H04N 23/611
See application file for complete search history.

(56) References Cited

U.S. PATENT DOCUMENTS

| | | | |
|---|---|---|---|
| 10,682,958 B2 * | 6/2020 | Oba | ............... B60R 1/12 |
| 11,368,616 B2 * | 6/2022 | Okabe | ............... H04N 23/62 |
| 2013/0096820 A1 | 4/2013 | Agnew | |

FOREIGN PATENT DOCUMENTS

| | | | |
|---|---|---|---|
| JP | 2009-149230 A | 7/2009 | |
| JP | 2014-534697 A | 12/2014 | |
| JP | 2019-043317 A | 3/2019 | |
| WO | WO-2016024405 A2 * | 2/2016 | ............... B60R 1/00 |

* cited by examiner

*Primary Examiner* — Ahmed A Berhan
(74) *Attorney, Agent, or Firm* — Volpe Koenig (57) ABSTRACT

The present invention relates to a display controlling device and method that is capable of achieving excellent ease in operations in relation to the display output of an in-vehicle display device. The device comprises an image acquiring means for acquiring a captured image of a vehicle's vicinity, a region setting means for setting a prescribed region between displaying means, installed within the vehicle's cabin and a position of a vehicle occupant within the cabin, a function setting means for setting a display function associated with a prescribed region, a viewpoint position detecting means for detecting a position relating to a viewpoint of the vehicle occupant, and an image controlling means for controlling the displaying means to display the captured image. When the position relating to the viewpoint is detected in a prescribed region, the controlling means executes the display function on the captured image displayed.

7 Claims, 10 Drawing Sheets

IN-VEHICLE DISPLAY CONTROLLING DEVICE AND DISPLAY CONTROLLING METHOD FOR IMPROVED DISPLAY OUTPUT OF OPERATIONS

FIELD OF INVENTION

The present invention relates to an in-vehicle display controlling device and display controlling method.

PRIOR ART

Conventionally, various types of display devices have been mounted in vehicle.

For example, in Patent Document 1 there are descriptions of, for example: "A cockpit camera 8 for imaging a head (a bust), where the location of a viewpoint 30 of the driver is detected through image recognition by image processing means is provided, and a view field image (3a) corresponding to the position of the actual viewpoint 30 is displayed on a display screen 35 of a display device 3"; "When the driver wishes to check the ground surface 9 further to the front side than the front of the vehicle 1, viewpoint movement is carried out naturally, without requiring an operation on a switch, or the like, through movement of the head forward so as to view the display screen 35 of the display device 3"; and "The effect is as looking through the display screen 35 to view a region 9a that is a hidden surface of the ground surface 9 in front of the vehicle 1. In other words, an effect is produced as if an observation window is provided that passes through the vehicle body structure at the position of the display screen 35."

Moreover, in Document 2 there is a description of "comprising: a display monitor 2 that is disposed movably in front of the driver's seat; moving means 3 and 4 for moving the display monitor 2; imaging means 5 through 7 for capturing images of the region in front of the vehicle, including a blind region of the vehicle; gazing point identifying means 12 for identifying a gazing point Pa that is viewed by the driver during travel; display controlling means 13 for causing the display monitor 2 to display an image of the vicinity of the gazing point Pa, identified by the gaze line identifying means 12, from images captured by the imaging means 5 through 7; and movement controlling means 13 for controlling the moving means 3 and 4 so that the image of the vicinity of the gazing point Pa that is displayed on the display monitor 2 will be displayed on the display monitor 2 in the gaze line Le of the driver that is facing the gazing point Pa that is identified by the gazing point identifying means 12."

Moreover, Patent Document 3 describes: "A display system for a vehicle that includes a plurality of display screens that are mounted in a vehicle cabin. Cameras are mounted on the outside of the vehicle, corresponding to the positions of the display screens. A (plurality of) sensor(s) is oriented facing the driver of the vehicle to sense the positions of the eyes of the driver. An ECU for a display system analyzes the positions of the eyes of the driver to calculate a gaze line. An image from a camera is displayed on a display screen corresponding to the gaze line of the driver. The result is that the display system provides, to the driver, an image that appears as if the vehicle body were not there, without the vehicle obstructing the view by the driver. Consequently, the display system provides parts wherein the vehicle body is virtually transparent, to thereby expand the field of view provided to the driver."

PRIOR ART DOCUMENTS

Patent Documents

[Patent Document 1] Japanese Unexamined Patent Application Publication 2019-043317
[Patent Document 2] Japanese Unexamined Patent Application Publication 2009-149230
[Patent Document 3] Japanese Translation of PCT International Application Publication 2014-534697

SUMMARY OF THE INVENTION

Problem Solved by the Present Invention

The prior art can output a display that provides a virtual view that compensates for blind spots caused by the vehicle body, or the like. However, the prior art cannot be said to envision completely active operations, or the like, of vehicle occupants in relation to the display output. For example, if one wishes to look closely at something that is being viewed directly, moving one's face closer is a natural action. However, when one wishes to look closely at an object that is displayed on a display device, moving one's face closer to the display device does not change the resolution, or the like of the display device. Thus, there is no improvement in visibility as there would be when moving one's face closer when viewing an object directly. While it is necessary to, for example, zoom the image on the display when one wishes to view a displayed object more closely, a display device that, as its primary purpose, is to supplement the field of view in particular, such an operation is not provided. Moreover, in some cases there is a need for not only zooming the image on the display, but also other operations, such as adding other information, to the display output.

Moreover, from the perspective of ensuring safe operation or of limitations depending on the seating position in in-vehicle display devices, when a variety of different operations are to be performed the ease of operations is extremely important.

Given this, the object of the present invention is to achieve better ease of operations in relation to the display output of an in-vehicle display device.

Means for Solving the Problem

In order to achieve the object set forth above, one typical display controlling device according to the present invention comprises: image acquiring means for acquiring a captured image wherein the vicinity of a vehicle has been imaged; region setting means for setting a prescribed region between displaying means, installed within a cabin of the vehicle and a position wherein a vehicle occupant is within the cabin of the vehicle; function setting means for setting a display function associated with a prescribed region; viewpoint position detecting means for detecting a position relating to a viewpoint of the vehicle occupant; and image controlling means for controlling the displaying means so as to display the captured image, wherein: when the position relating to the viewpoint is detected as being in a prescribed region, the controlling means execute the display function on the captured image displayed by the displaying means.

Effects of the Invention

The present invention enables achievement of improved ease of operations with respect to a display output of an

DETAILED DESCRIPTION

An embodiment will be explained below using the drawings.

Embodiment 1

Figure 1:
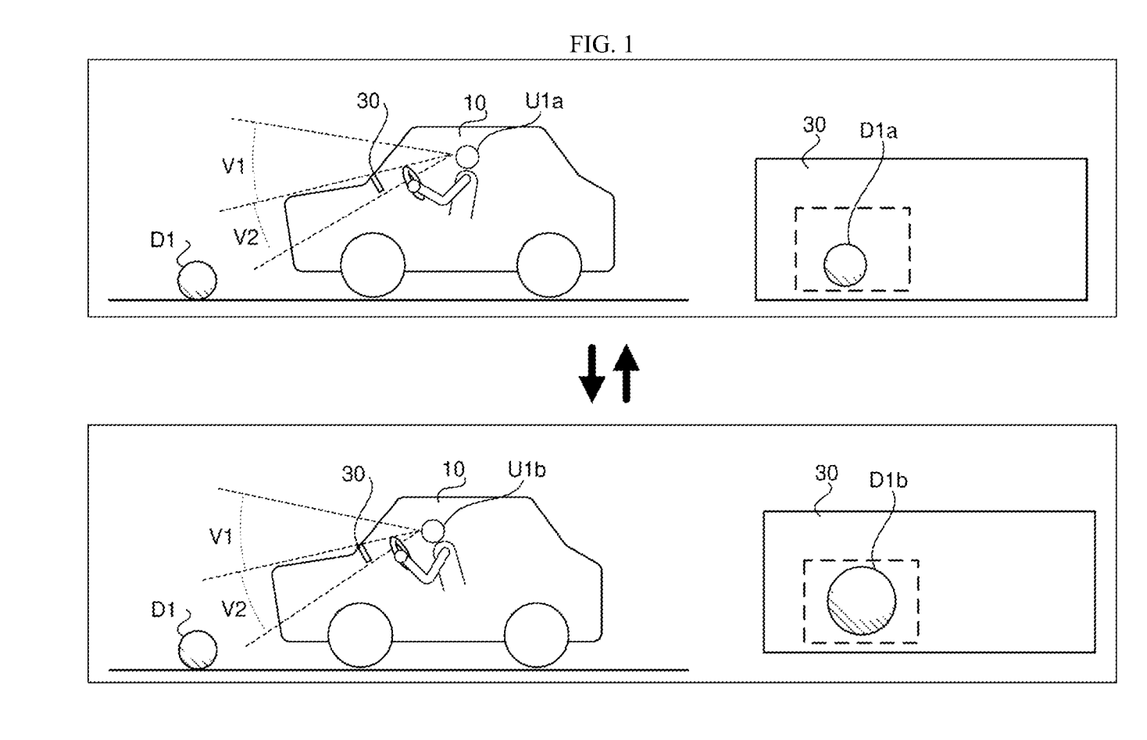
FIG. 1 is an explanatory diagram for explaining an overview of a display controlling device according to a first embodiment.

FIG. 1 is an explanatory diagram for explaining an overview of a display controlling device according to a first embodiment. A display 30, which is displaying means, is installed in a dashboard of a vehicle 10. The display 30 has, for example, a display region from the driver seat side to the passenger seat side of the dashboard. The display control device that is mounted in the vehicle 10. The display control device acquires the state of a vehicle occupant U1 (the driver) from an interior camera, to detect a location relating to a viewpoint of the vehicle occupant U1 (U1a and U1b) (for example, the head thereof) in order to control the display on the display 30.

Specifically, the display controlling device performs image processing on an image captured by an exterior camera based on the position of the head of the vehicle occupant U1 to calculate an exterior image that would be visible from the viewpoint of the vehicle occupant U1. And the display controlling device displays it on the display 30 to provide a view V2 that virtually passes through the display 30. The result is that the vehicle occupant U1 can concatenate the directly visible view V1 and the virtual view V2, expanding the view of the vehicle occupant U1.

A case wherein an obstacle D1 exists to the front of the vehicle 10 is shown in FIG. 1. The obstacle D1 is blocked by the hood of the vehicle 10, so is not included in the view V1 that could be viewed directly. However, the vehicle occupant U1 is able to see the obstacle D1 through a virtual view V2 that is provided by the display 30 displaying a virtual view image.

Moreover, depending on the positional relationship between the head of the vehicle occupant U1 and the display 30, the display controlling device executes a function in relation to the display of the display 30.

As a specific example, the vehicle occupant U1a in FIG. 1 shows a state wherein a driving operation is performed in a normal driving position. On the other hand, the vehicle occupant U1b shows a state that is leaning forward with the face nearer to the display 30. When the head of the vehicle occupant U1 is in a prescribed region, set in the vicinity of the display 30, the display controlling device executes a function to zoom the image on the display of the obstacle D1.

If the vehicle occupant U1 is in the state shown as U1a, the display 30 displays an image of the obstacle D1 that is calculated as being visible from that viewpoint as an obstacle image D1a. If the vehicle occupant U1 is in the state shown as U1b, an obstacle image D1b wherein the image of the obstacle D1 is shown with zoomed is displayed.

In other words, the obstacle image D1b will be zoomed rather than the image that is calculated as being visible from the position of the vehicle occupant U1a. Therefore, the vehicle occupant U1b enable to view the obstacle D1 in detail.

Moving one's face closer to the object is a natural action, when one wishes to examine an object closely. To handle this action as an operation for requesting an the zoom the image displayed on the display enables the display zooming function to be executed with improved ease of operation. Moreover, the fact that there is no need to touch the display 30 contributes to an improvement in the ease of operation.

Figure 2:
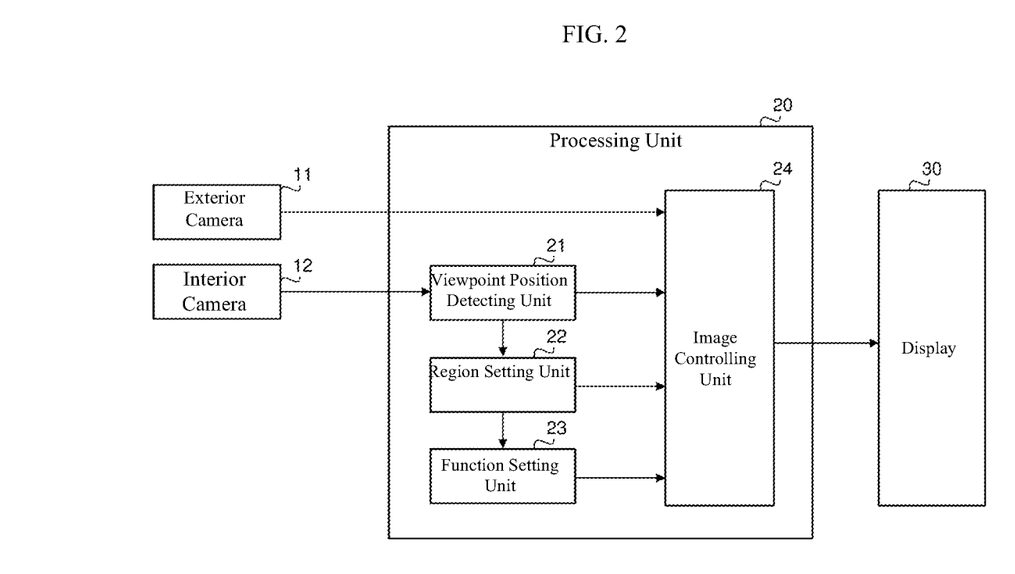
FIG. 2 is a structural diagram for a display controlling device according to the first embodiment.

FIG. 2 is a structural diagram for the display controlling device according to the first embodiment. As illustrated in FIG. 2 the display controlling device has an exterior camera 11, an interior camera 12, the processing unit 20, and a display 30. Additionally, although not illustrated, the display controlling device is provided with an arbitrary input interface. The input interface can be a touch panel that is integrated with the display 30, or can be a physical button. In this embodiment, the explanation will be for that wherein a touch panel that is integrated with the display 30 is provided.

The exterior camera 11 is image acquiring means for acquiring a captured image wherein the surroundings of the vehicle have been imaged.

The interior camera 12 is imaging means for imaging the interior of the vehicle cabin, to function as a sensor for acquiring the state of a vehicle occupant within the vehicle cabin.

The display 30 is displaying means equipped within the cabin of the vehicle.

The processing unit 20 has a viewpoint position detecting unit 21, a region setting unit 22, a function setting unit 23, and an image controlling unit 24. If the processing unit is a computer, functions corresponding to the viewpoint position detecting unit 21, the region setting unit 22, the function setting unit 23, and the image controlling unit 24 should be achieved through execution of a program by a CPU (Central Processing Unit).

The viewpoint position detecting unit 21 is viewpoint position detecting means for detecting a position relating to the viewpoint of a vehicle occupant. Specifically, the viewpoint position detecting unit 21 carries out an image recognizing process on an image captured by an interior camera 12 to detect the position of the head of the vehicle occupant, as the position relating to the viewpoint of the vehicle occupant.

The region setting unit 22 is region setting means for setting a prescribed region, between the occupancy position of the vehicle occupant within the cabin of the vehicle, and a display 30.

The function setting unit 23 is function setting means for setting a display function corresponding to a prescribed region. An arbitrary function can be set for the display function, such as zooming a captured image, adding the display of route information to the captured image, displaying information regarding playback content, or the like.

The image controlling unit 24 is image controlling means for controlling the display of a captured image on the display 30. The captured image that is displayed on the display 30 can be an image captured by the exterior camera 11. Preferably, the captured image that is displayed on the display 30 can be a virtual view image that is generated from an image captured by the exterior camera 11.

The virtual view image is that wherein an image of outside of the vehicle, as calculated as being visible from the viewpoint of the vehicle occupant, is generated based on the viewpoint position detected by the viewpoint position detecting unit 21.

Moreover, the image controlling unit 24 executes a display function that has been set by the function setting unit 23 on the captured image that is displayed on the display 30, when detecting the head of the vehicle occupant (a position relating to the viewpoint) is in a region which is set by the region setting unit 22. In this case, if the captured image that is displayed on the display 30 is a virtual view image, the image controlling unit 24 will execute the display function on the virtual view image.

For example, the region setting unit 22 set a region near the display 30, and, if the function setting unit 23 associates the display zooming function with that region. In this case, the image controlling unit 24 displays the visible view image with zooming the image displayed on the display 30 if the head of the vehicle occupant enters into a region that is near the display 30. A part of the visible view image can be zoomed. For example, an object in the visible view image viewed by the vehicle occupant can be identified based on detecting the gaze line of the vehicle occupant and the identified object can be zoomed selectively.

Additionally, if the function associated by the function setting unit 23 is that of adding route information to the display, the image controlling unit 24 would superimpose route information on the virtual view image when the head of the vehicle occupant enters into that region. Similarly, if the function associated by the function setting unit 23 is that of displaying music information, the image controlling unit 24 would display information relating to music when the head of the vehicle occupant enters into that region. For example, if the vehicle occupant has interest in a song that is playing and brings his or her face toward the display 30, information can be provided by displaying the name of the song and the name of the artist.

The region setting unit 22 can set multiple divided regions as prescribed regions with different distances from the display 30. In this case, the function setting unit 23 can set respective functions for the plurality of divided regions. For example, if functions for zooming the image displayed on the display by different scales are set for the plurality of divided regions, the object can be displayed more largely when the face is closer to the display 30.

Figure 3:
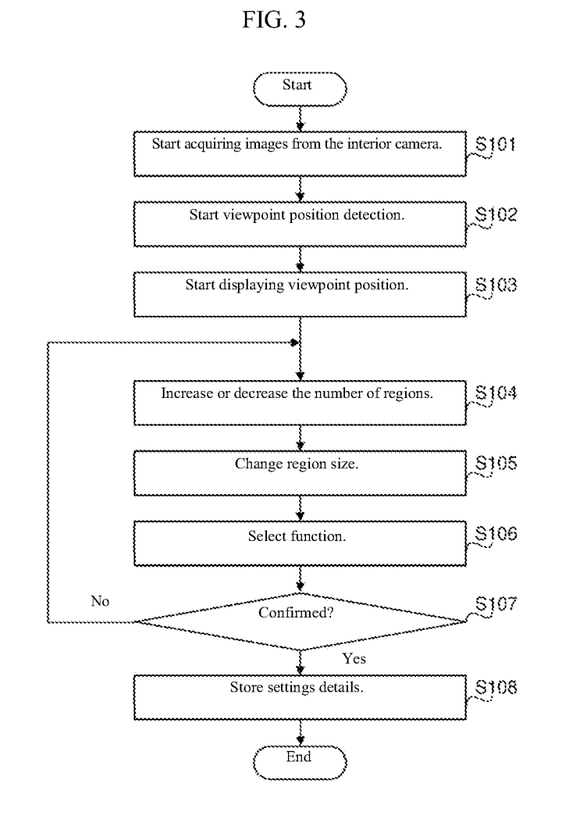
FIG. 3 is a flowchart showing a procedure when setting a region.

FIG. 3 is a flowchart showing a set-up procedure to set a region. When the function set for a region is called, the processing unit 20 of the display controlling device sequentially executes the procedure shown in FIG. 3.

At the beginning of the process, the interior camera 12 starts to acquire an image (Step S101). The viewpoint position detecting unit 21 begins a process for detecting the viewpoint position (for example, the head position of the vehicle occupant) from the image acquired by the interior camera 12 (Step S102). Additionally, the image controlling unit 24 begins to display the positional relationship between the viewpoint position and the display 30 (Step S103).

The region setting unit 22 receives an input operation from a vehicle occupant and increases or decreases the number of regions (Step S104) and changes the region size (Step S105). The function setting unit 23 receives selections for functions corresponding to the individual regions (Step S106).

Thereafter, Step S104 through S016 are repeated until a confirmation operation is received. When the confirmation operation is received (Step S107: YES), the image controlling unit 24 stores the detailed settings for the regions and functions (Step S108) and concludes the process for setting up regions.

Figure 4:
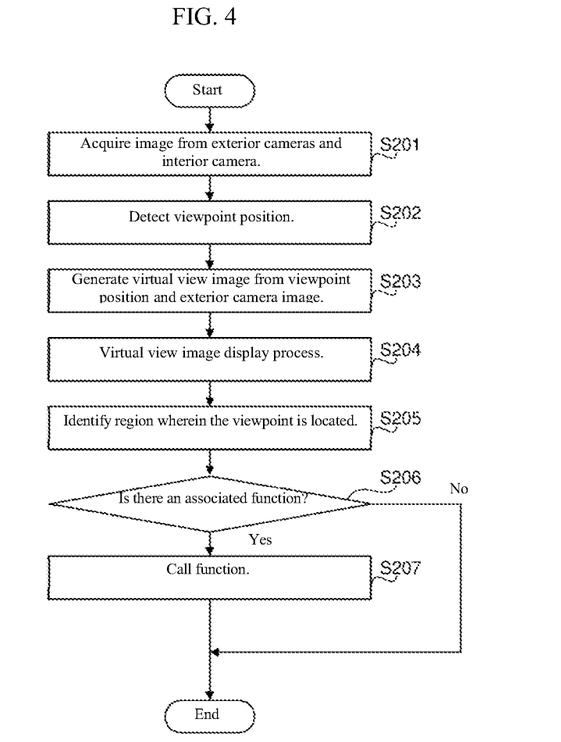
FIG. 4 is a flowchart showing a procedure when operating.

FIG. 4 is a flowchart showing a procedure when operating. When the in-vehicle device is supplied with power, the processing unit 20 of the display controlling device repeatedly executes the procedure shown in FIG. 4.

First the exterior camera 11 and interior camera 12 acquire respective images (Step S201).

The viewpoint position detecting unit 21 detects the viewpoint position (for example, the position of a head) from the image acquired by the interior camera 12 (Step S202). The image controlling unit 24 generates a virtual view image from the viewpoint position and the image of the exterior camera 11 (Step S203). And the image controlling unit 24 executes a virtual view image displaying process for displaying a virtual view image on the display 30 (Step S204).

Moreover, the image controlling unit 24 identifies the region wherein the viewpoint position is located (Step S205).

If a function is set corresponding to the region wherein the viewpoint position is located (Step S206: YES), the image controlling unit 24 calls and executes that function (Step S207), to complete the process. After the process has been completed, processing starts again from Step S201. If no function has been set corresponding to the region wherein the viewpoint position is located (Step S206: NO), then processing is terminated at that point, and processing begins again with Step S201.

Figure 5:
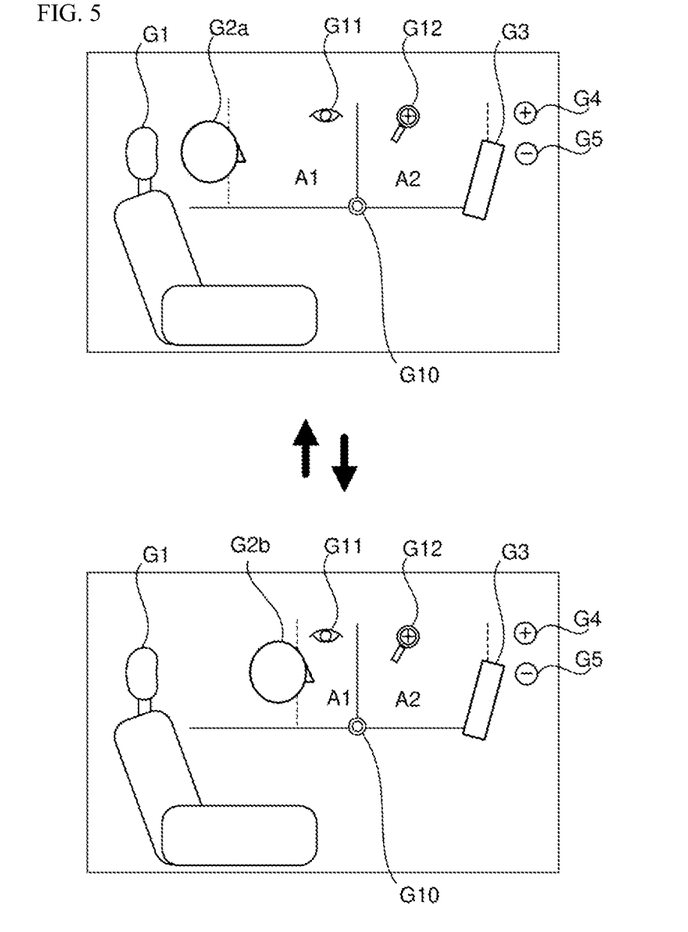
FIG. 5 is a specific example of a screen output when setting settings.

FIG. 5 is a specific example of a screen output during the set-up procedure.

During the set-up procedure, the display 30 displays a seat image G1, a head image G2 (G2a and G2b), a display image G3, an Add Region button G4, and a Remove Region button G5.

The seat image G1 is an image for displaying schematically the position of the vehicle occupant within the vehicle. The head image G2 is an image for displaying schematically the position of the head of the vehicle occupant. The display image G3 is an image for indicating schematically the position of the display 30. The head image G2 is located based on the detection result by the viewpoint position detecting unit 21, where the head can be shown in any position with relation to the seat and the display 30.

A boundary indicator G10 indicates a boundary of a region that is set between the position of the occupant within the vehicle and the display 30. In FIG. 5, region A1 is set from the seat image G1 to the boundary indicator G10, and region A2 is set from the boundary indicator G10 to the display image G3.

Additionally, a function icon that indicates a display function is displayed for each individual region. The function icon Gi1 that is displayed in region A1 indicates that no display function has been set. The function icon G12 that is displayed in the region A2 indicates a function for zooming the image displayed on the display.

Here the position of the head image G2 is changed in real time using detection results from the viewpoint position detecting unit 21. The head image G2a in FIG. 5 indicates the position of the head in a state wherein the driving operation is carried out in the normal driving position. The head image G2b indicates the position of the head in a state wherein the posture is that of leaning forward with the face near the display 30. Indicating the position of the head in real time enables the vehicle occupant to identify easily the relationship between the position of the occupant's own head and the region.

Figure 6:
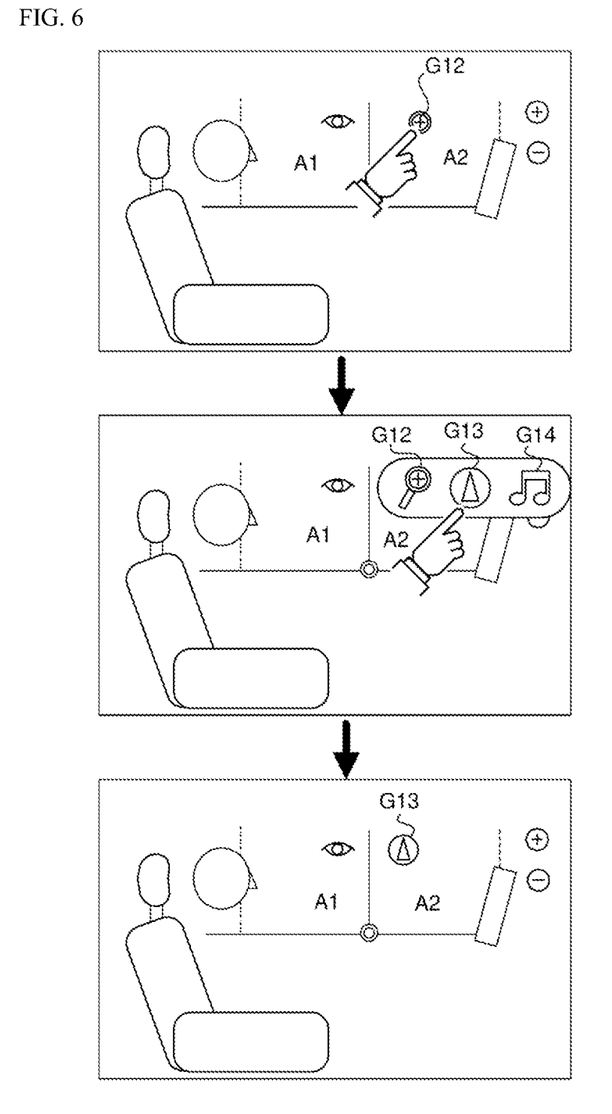
FIG. 6 is a specific example of a process for assigning a function to a region.

FIG. 6 is a specific example of a process for associating a function with a region. As illustrated in FIG. 6, when a long-push operation has been received by the function icon G12 in the region A2, the image controlling unit 24 displays the selectable display functions. In FIG. 6, the function icon G12 for the function for zooming the image displayed on the display, the function icon G13 for the function for adding route information to the display, and the function icon G14 for displaying music information are displayed. When the zoom function icon G13 is selected, the function icon G13 will be displayed thereafter in region A2. In this case, the function setting unit 23 assigns "Add route information to the display" corresponding to the region A2.

Figure 7:
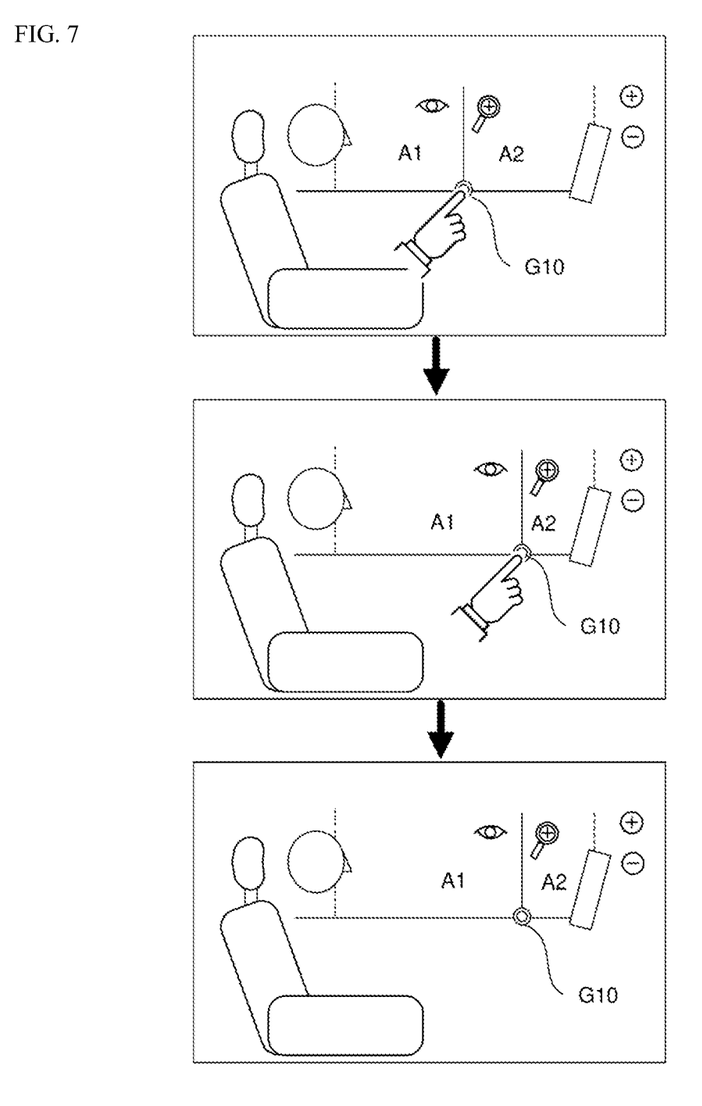
FIG. 7 is a specific example of a process for changing a region size.

FIG. 7 is a specific example of a process for changing the size of a region. As shown in FIG. 7, when a boundary indicator G10 is subjected to a sliding operation, the image controlling unit 24 changes the position of the boundary indicator G10 in accordance with the amount of sliding. In this case, the region setting unit 22 changes the sizes of the region A1 and the region A2 depending on the position after the change.

Figure 8:
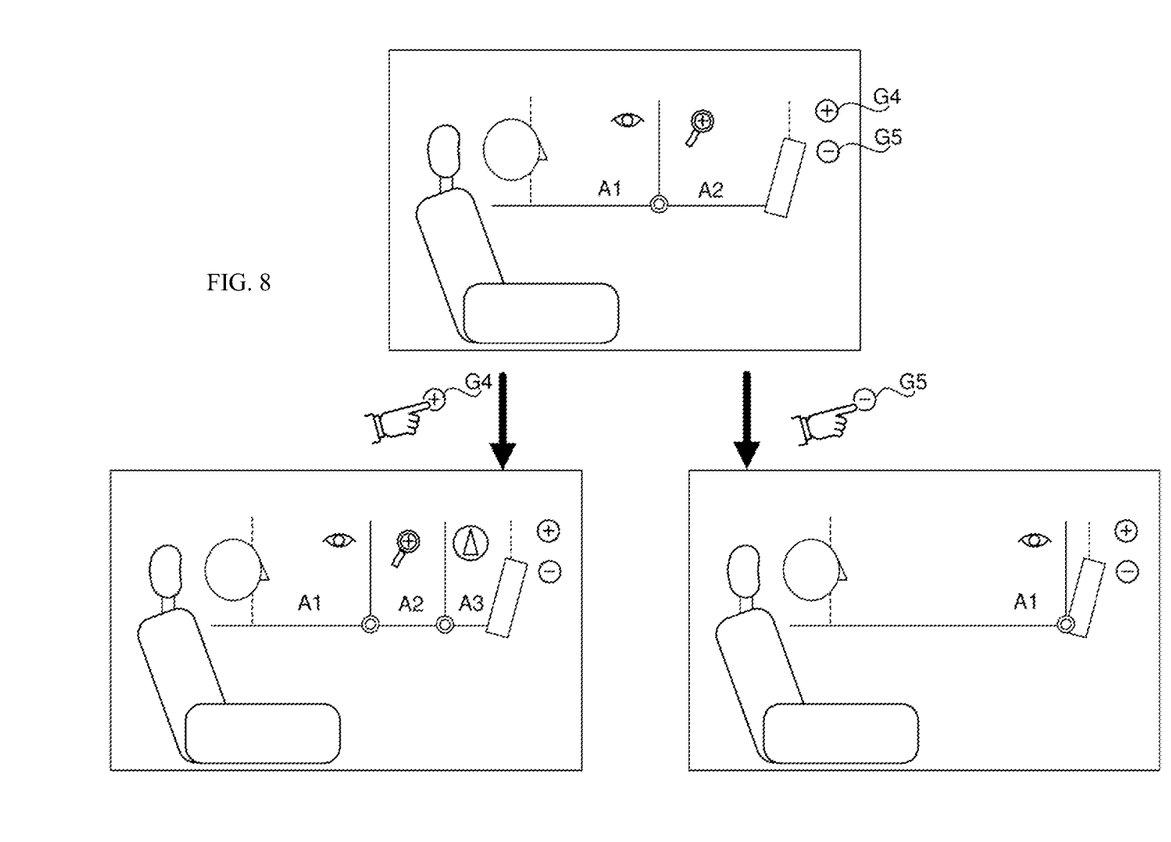
FIG. 8 is a specific example of increasing or decreasing the number of regions.

FIG. 8 is a specific example of increasing or decreasing the number of regions. As illustrated in FIG. 8, when the Add Region button G4 is pressed, a new region A3 is added in a state wherein region A1 and region A2 have been set up.

As an example, the additional region can be generated through dividing into two the existing region that is nearest to the display 30. Moreover, the display function of the added region can be identical to that of the region prior to division, or a display function that is not set in the existing regions can be applied as a default value.

When the Remove Region button G5 is pressed in a state wherein region A1 and region A2 have been set up, region A2 will be removed. The result is that only region A1, for which no display function has been set, will remain. In other words, all regions wherein display functions have been set can be removed.

If the removal operation is received in a state wherein there is a plurality of regions, the region that is to be removed may be set arbitrarily. However, as an example, the regions wherein display functions have been set can be removed with priority when there are both of regions for which display functions have been set and regions for which display functions have not been set. This priority sequence positions the display function as an additional function that is executed in response to a clear operation by the vehicle occupant. If this positioning is used, preferably the region corresponding to the normal driving region will always have no display function set.

If the Add Region button G4 is pressed in a state wherein there is only the region A1, for which the display function has not been set, a new region A2 can be added on the display 30 side. And the new region is associate with the function for zooming the image displayed on the display 30 as the display function in the default state.

Figure 9:
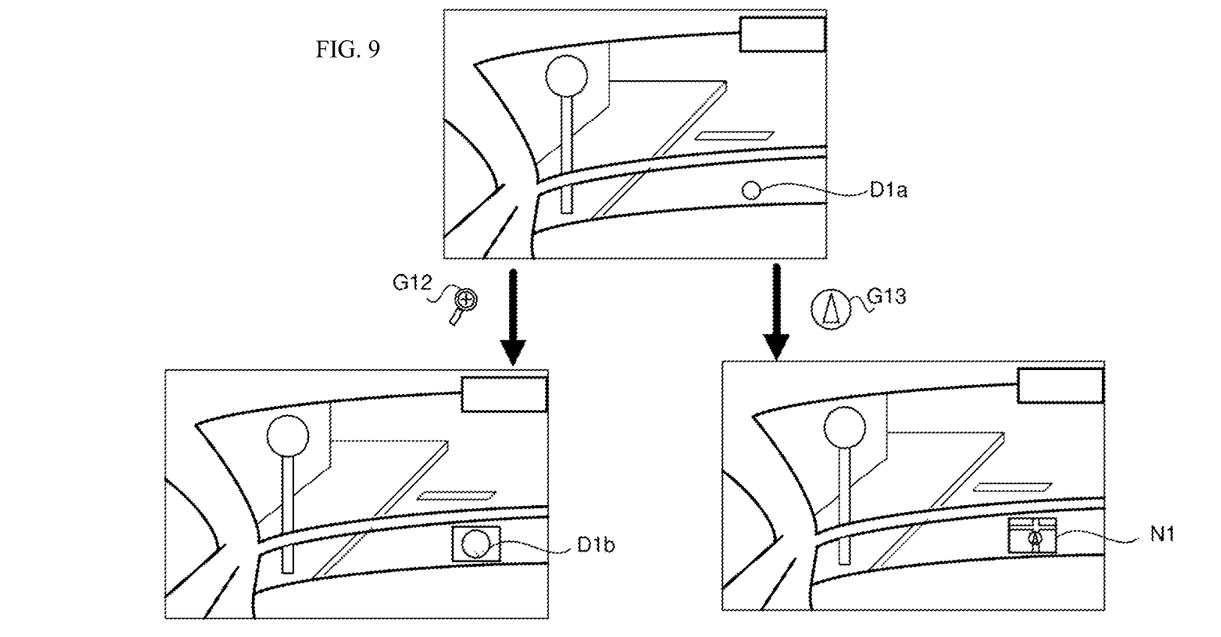
FIG. 9 is an explanatory diagram for a specific example of a display function.

FIG. 9 is an explanatory diagram of a specific example of a display function.

If the head of the vehicle occupant moves so as to enter into the region for which the function for zooming the image displayed on the display has been set, the image controlling unit 24 zooms the obstacle image D1a to display an obstacle image D1b.

Similarly, if the head of the vehicle occupant moves so as to enter into a region for which the function for adding route information to the display has been set, the image controlling unit 24 will display route information N1.

Figure 10:
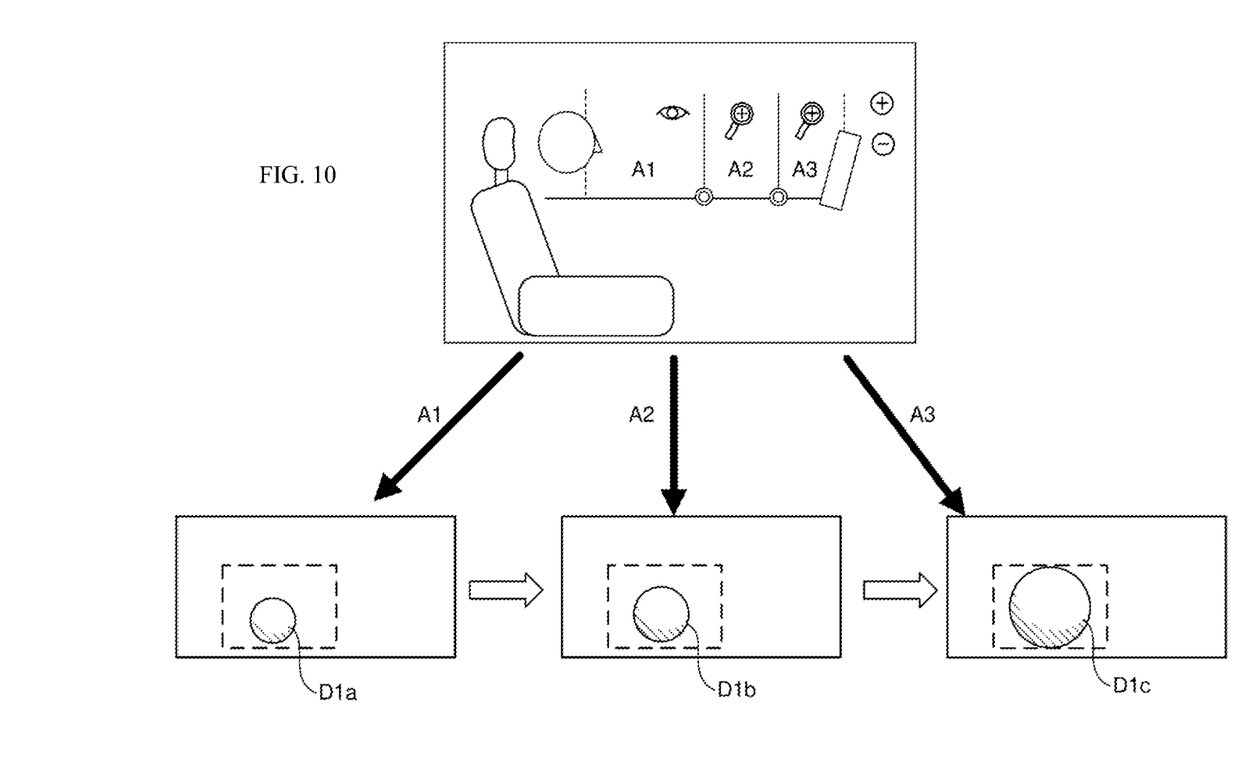
FIG. 10 is an explanatory diagram of a zooming function that uses a plurality of regions.

FIG. 10 is an explanatory diagram for a zooming function that uses a plurality of regions. In FIG. 10, regions A1 through A3 are set up sequentially from the position at which the vehicle occupant is present in the vehicle up to the display 30. The region A1 has no display function set. Functions to zoom the imaged displayed on the display are set for region A2 and region A3. In other words, region A2 and region A3 are divided regions provided in a prescribed region wherein display functions are set, where different scales are set for region A2 and region A3. The zoom displays with different scales can be set up as individual display functions, or different scales can be produced through repetitively applying a single function. For example, with the magnification rate of the display zooming function being a uniform 1.2, when entering into region A2 from region A1 the magnification rate will be 1.2, and when entering region A3 from region A2 the magnification rate can be applied repetitively with the magnification rate being 1.2×1.2=1.44.

In FIG. 10, when the head of the vehicle occupant is in region A1, an obstacle image D1a that corresponds to a scale of "1" is displayed. When the head has entered region A2, an obstacle image D1b with a scale of "1.2" is displayed. When it has entered into region A3, an obstacle image D1c with a scale of "1.44" is displayed. In this way, associating different scales to the divided regions makes it possible to carry out zooming in stages depending on the position of the head.

As described above, the device of the disclosure comprises: image acquiring means for acquiring a captured image wherein the vicinity of a vehicle has been imaged; region setting means for setting a prescribed region between displaying means, installed within a cabin of the vehicle and a position wherein a vehicle occupant is within the cabin of the vehicle; function setting means for setting a display function associated with a prescribed region; viewpoint position detecting means for detecting a position relating to the viewpoint of the vehicle occupant; and image controlling means for controlling the displaying means so as to display the captured image, wherein: when the position relating to the viewpoint is detected as being in the prescribed region, the controlling means executes the display function on the captured image displayed by the displaying means. This structure and these operations make it possible to check the state far from the vicinity of the vehicle (through zooming the image displayed on the display of the camera image), or to check information required in operation, other than a camera image (such as navigation information) without carrying out any special operation, through merely moving the viewpoint of the vehicle occupant (the eyes, head, or face) into a specific area (which is preferably a region near the display).

This makes it possible to achieve excellent ease of operations in relation to the display output of the in-vehicle display device.

Moreover, in the device according to the present disclosure, the image controlling means performs processing on the captured image based on the position relating to the viewpoint of the vehicle occupant to generate a virtual view image that is an image of outside of the vehicle that is calculated as being visible from the viewpoint of the vehicle occupant, and if the position relating to the viewpoint is identified as being within the prescribed region, executes the display function on the virtual view image.

This makes it possible to provide a virtual view depending on the viewpoint of the vehicle occupant, and to call an additional function when the face of the vehicle occupant nears the displaying means.

Moreover, in the device according to the present disclosure, the region setting means set up a plurality of divided regions in the prescribed region with different distances to the displaying means, and the function setting means set different scales for the plurality of divided regions.

This structure and these operations make it possible to carry out zooming in stages depending on the position of the head of the vehicle occupant.

Note that the present invention is not limited to the embodiment set forth above, but rather includes a variety of modified examples. For example, the embodiments set forth above were for explaining the details so as to explain the present invention so as to be easily understood, and there is no limitation to necessarily providing all of the features that were explained. Moreover, insofar as these features are not removed, features may be substituted or added.

For example, if there is another vehicle occupant other than the driver, the present invention can be applied to the other vehicle occupant. Moreover, the present invention can be applied through designating a specific vehicle occupant among a plurality of vehicle occupants.

Moreover, the state of the vehicle occupant may be acquired using an arbitrary sensor other than an interior camera, such as, for example, a LIDAR (Light Detection and Ranging, Laser Imaging Detection and Ranging), a smart phone that is installed, or the like. Moreover, outputs of a plurality of sensors or a plurality of types of sensors can be combined for use.

Moreover, the functions related to each other can be set when setting up functions for a plurality of regions. For example, a process can be performed an air conditioning main menu is started first when the face of the vehicle occupant is brought closer to the displaying means, and the temperature setting is increased when the face is brought closer.

Moreover, the embodiment was presented wherein the regions were set on the display screen, but the positional relationships between the display and the viewpoint can be designated through an arbitrary method. For example, distances from the display or spaces within the vehicle classified prescribed standards in advance can be designated. The regions in the present invention should identify whether or not to start a display function based on the viewpoint position.

Moreover, the present invention can be applied to a pillar monitor that provides a view looking through the pillar, an electronic mirror that provides a side mirror function, a backing mirror, or the like.

Moreover, for example, a plurality of display devices can be installed (each having the functions of the present invention) as a pillar monitor or an electronic mirror. And regions and functions can be set for each individual displayed device. In this case, preferably the view of the vehicle occupant is identified to select the display device that is to execute the functions of the present invention.

REFERENCE LIST

11: Exterior Camera
12: Interior Camera
20: Processing Unit
21: Viewpoint Position Detecting Unit
22: Region Setting Unit
23: Function Setting Unit
24: Image Controlling Unit
30: Display

The invention claimed is:
1. A display controlling device comprising:
a camera for acquiring a captured image wherein a vicinity of a vehicle has been imaged;
at least one display installed within a cabin of the vehicle; and
a processor communicatively coupled to the camera and the at least one display, wherein the processor is configured to:
set a prescribed region between the at least one display and a position wherein a vehicle occupant is within the cabin of the vehicle,
set a display function chosen by the vehicle occupant from among multiple display functions as the display function associated with the prescribed region,
detect a position relating to a viewpoint of the vehicle occupant, and
control the at least one display so as to display the captured image, wherein:
when the position relating to the viewpoint is detected as being in the prescribed region, the processor executes the display function on the captured image displayed by the at least one display.
2. A display controlling device set forth in claim 1, wherein:
the processor generates a virtual view image that is an image of the outside of the vehicle that is calculated as being visible from the viewpoint of the vehicle occupant, by processing the captured image based on the position relating to the viewpoint of the vehicle occupant, and, if the position relating to the viewpoint is identified as being within the prescribed region, executes the display function on the virtual view image.
3. A display control device set forth in claim 1, wherein:
the display function zooms the captured image.
4. A display controlling device set forth in claim 3, wherein:
the processor sets a display function from the multiple display functions that zooms the captured image for a prescribed region that is set in the vicinity of the at least one display; and
the processor zooms the captured image, and causes the captured image to be displayed on the at least one display, when the position relating to the viewpoint moves toward the at least one display to enter into the prescribed region.

5. A display controlling device set forth in claim 3, wherein:
the processor sets a plurality of divided regions, with different distances to the at least one display, in the prescribed region; and
the processor sets different enlargement ratios for the plurality of divided regions.

6. A display controlling device set forth in claim 1, wherein:
the display function adds route information to the display of the captured image that is displayed on the at least one display.

7. A display controlling method, performed by:
a display controlling device, for controlling display of at least one display that is installed within a cabin of a vehicle, including at least a processor communicatively connected to the at least one display, the display controlling method includes:
acquiring a captured image wherein the vicinity of the vehicle has been imaged;
setting a prescribed region between the at least one display and a position wherein a vehicle occupant is within the cabin of the vehicle;
setting a display function chosen by the vehicle occupant from among multiple display functions as the display function associated with the prescribed region;
detecting a position relating to a viewpoint of the vehicle occupant; and
controlling the at least one display so as to display the captured image, wherein:
when the position relating to the viewpoint is detected as being in the prescribed region, the processor executes the display function on the captured image displayed by the at least one display.

\* \* \* \* \*